United States Patent
Panainte et al.

(10) Patent No.: US 11,854,315 B1
(45) Date of Patent: Dec. 26, 2023

(54) CHARGING STATION RECOMMENDATION FOR AN ELECTRIC VEHICLE

(71) Applicant: Mercedes-Benz Group AG, Stuttgart (DE)

(72) Inventors: Sorin Panainte, Holland, MI (US); Francois Charles Piednoel, Santa Clara, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/147,153

(22) Filed: Dec. 28, 2022

Related U.S. Application Data

(63) Continuation of application No. 17/984,305, filed on Nov. 10, 2022.

(51) Int. Cl.
 *G07C 5/08* (2006.01)
 *H02J 7/00* (2006.01)
 *H01M 10/48* (2006.01)
 *G01C 21/34* (2006.01)
 (Continued)

(52) U.S. Cl.
 CPC ....... *G07C 5/0808* (2013.01); *G01C 21/3476* (2013.01); *H01M 10/44* (2013.01); *H01M 10/48* (2013.01); *H02J 7/005* (2020.01); *H02J 7/007* (2013.01); *B60L 58/16* (2019.02); *H01M 2220/20* (2013.01)

(58) Field of Classification Search
 None
 See application file for complete search history.

(56) References Cited

U.S. PATENT DOCUMENTS

| 2017/0087999 A1 | 3/2017 | Miller et al. |
| 2017/0168493 A1 | 6/2017 | Miller et al. |
| 2018/0086221 A1 | 3/2018 | Bouard et al. |

(Continued)

FOREIGN PATENT DOCUMENTS

| CN | 111709655 A | 9/2020 |
| CN | 112440809 A | 3/2021 |

(Continued)

OTHER PUBLICATIONS

S. H. Kim, H. M. Lee and Y. -J. Shin, "Aging Monitoring Method for Lithium-Ion Batteries Using Harmonic Analysis," in IEEE Transactions on Instrumentation and Measurement, vol. 70, pp. 1-11, 2021, Art No. 3506811, doi: 10.1109/TIM.2020.3043097. (Year: 2020).*

*Primary Examiner* — Peter D Nolan
*Assistant Examiner* — Michael F Whalen
(74) *Attorney, Agent, or Firm* — Dority & Manning, P. A.

(57) ABSTRACT

Subject matter disclosed herein may relate to systems, devices and/or processes for extracting one or more features of an electric current coupled to an electric vehicle in response to initiating a charging process at a first charging station, determining one or more performance characteristics of the electric vehicle based, at least in part, on the charging process, determining a charge performance model based, at least in part, on the one or more determined one or more performance characteristics of the electric vehicle and displaying a recommendation for at least a second charging station based, at least in part, on a comparison between one or more features of the at least the second charging station and the charge performance model.

20 Claims, 5 Drawing Sheets

(51) Int. Cl.
*H01M 10/44* (2006.01)
*B60L 58/16* (2019.01)

(56) References Cited

U.S. PATENT DOCUMENTS

2019/0383637 A1* 12/2019 Teske ..................... B60L 53/14
2020/0333151 A1    10/2020 Akhtar
2022/0404164 A1* 12/2022 Teske ..................... B60L 53/14
2022/0404165 A1* 12/2022 Teske ................. G01C 21/3889

FOREIGN PATENT DOCUMENTS

| | | |
|---|---|---|
| CN | 113147476 A | 7/2021 |
| CN | 113954682 A | 1/2022 |
| KR | 20200098101 A | 8/2020 |
| KR | 102386343 B1 | 4/2022 |
| WO | WO-2023052677 A1 * | 4/2023 |
| WO | WO-2023052679 A1 * | 4/2023 |

* cited by examiner

CHARGING STATION RECOMMENDATION FOR AN ELECTRIC VEHICLE

BACKGROUND

Field

Subject matter disclosed herein may relate to systems, devices, and/or processes for recommendation of a charging station to charge an electric vehicle based, at least in part, for example, on features extracted from a charging current during the process of charging the electric vehicle.

Information

An operator of an electric vehicle may charge energy storage cells of the electric vehicle via a home-based charger, which operates to convert ordinary household voltage and current, for example, to a voltage and current suitable for charging an electric vehicle. However, at times, such as when traveling in an electric vehicle over long distances, the electric vehicle may require charging at charging stations spaced at various locations along highways and other thoroughfares. In some instances, especially when traveling over considerable distances, an electric vehicle may require charging at several intervals throughout the day such as, for example, at 200-400 kilometer intervals. Thus, responsive to a need to visit charging stations, perhaps several times during a single day, it may become apparent that electric vehicle charging stations vary in available facilities, amenities, options for charging parameters, and overall customer experience.

In addition, although a charging station may make certain claims concerning available charging waveforms and charge quality, such claims may be unverifiable or may be general in nature, so as to be at least partially inaccurate with respect to a specific electric vehicle. Thus, an electric vehicle operator may find themselves at an electric vehicle charging station that does not charge the operator's electric vehicle as advertised or provides advertised charging options that are not entirely compatible with the operator's particular electric vehicle. Thus, improvements in systems and processes to select and/or recommend charging services that are suited (or even optimized) for particular electric vehicles continues to be an active area of investigation.

SUMMARY

One general aspect includes a method that includes extracting one or more features of an electric current coupled to an electric vehicle in response to initiating a charging process at a first charging station. The method also includes determining one or more performance characteristics of the electric vehicle based, at least in part, on the one or more features of the electric current coupled to the electric vehicle in response to initiating the charging process at the first charging station. The method also includes determining a charge performance model based, at least in part, on the one or more determined performance characteristics of the electric vehicle. The method also includes displaying a recommendation for at least a second charging station based, at least in part, on the charge performance model and one or more features of the at least the second charging station.

In particular embodiments, extracting the one or more features of the electric current includes at least one of detecting an indication of coupled current abnormalities, an indication of voltage abnormalities, an indication of power factor abnormalities, an indication of noise content of the coupled electric current, or an indication of total harmonic distortion of the coupled electric current. In particular embodiments, determining the one or more performance characteristics of the electric vehicle includes determining a period of time to substantially fully charge the electric vehicle. In particular embodiments, determining the one or more performance characteristics of the electric vehicle includes determining a measure of electrical stress or thermal stress on one or more energy storage elements of the electric vehicle. In particular embodiments, displaying the recommendation for the at least the second charging station is further based on computing a predicted time to at least partially charge the electric vehicle via the at least the second charging station. In particular embodiments, displaying the recommendation for the at least the second charging station is further based on computing an estimated travel time to the at least the second charging station. In particular embodiments, the method may further include displaying at least a portion of a route map from a present location to the at least the second charging station. In particular embodiments, the method may further include displaying a second recommendation for the at least the second charging station based, at least in part, on parameters exclusively related to the at least the second charging station. In particular embodiments, determining the charge performance model includes assigning at least one weighting factor to the one or more features extracted during the charging process. In particular embodiments, the at least one assigned weighting factor relates to one or more of electrical or thermal stress of a battery utilized by the electric vehicle, life of a battery utilized by the electric vehicle, and age of a battery utilized by the electric vehicle.

Another general aspect includes an apparatus to recommend a charging station, including one or more processors coupled to at least one memory device, the one or more processors responsive to executing the instructions, to extract one or more features of an electric current to be coupled to an electric vehicle in response to initiation of a charging process at a first charging station. The one or more processors may additionally operate to determine one or more performance characteristics of the electric vehicle based, at least in part, on the one or more features of the electric current coupled to the electric vehicle in response to initiating the charging process at the first charging station. The one or more processors may additionally operate to determine a charge performance model based, at least in part, on the one or more determined performance characteristics of the electric vehicle. The one or more processors coupled to the at least one memory device may additionally display, or cause a display device of the electric vehicle to display, a recommendation for at least a second charging station based, at least in part, on the charge performance model and the one or more features of the at least the second charging station.

In particular embodiments, the one or more features to be extracted from the coupled electric current include one or more of an indication of abnormalities of the coupled electric current, an indication of abnormalities of a voltage of the coupled electric current, an indication of abnormalities in power factor of the coupled electric current, an indication of noise content of the coupled electric current, and an indication of total harmonic distortion of the coupled electric current. In particular embodiments, the determined one or more performance characteristics of the electric vehicle includes a period of time to substantially fully charge the electric vehicle or a measure of electrical or thermal stress on one or more energy storage elements of the electric vehicle. In particular embodiments, the one or more processors coupled to the at least one memory device, when displaying or causing the display device to display the recommendation for the at least the second charging station are additionally to display or cause the display device to display a predicted time to at least partially charge the electric vehicle via the at least the second charging station, and/or to display an estimated travel time to the at least the second charging station. In particular embodiments, the one or more processors coupled to the at least one memory device, when displaying or causing the display device to display the recommendation for the at least the second charging station are additionally to display, when displaying or causing the display device to display, a location of the at least the second charging station based, at least in part, on parameters exclusively related to the at least the second charging station. In particular embodiments, the one or more processors coupled to the at least one memory device are additionally to determine the charge performance model via assignment of at least one weighting factor to the one or more features extracted during the process to charge the electric vehicle.

Another general aspect includes an article including a non-transitory computer-readable medium having instructions encoded thereon which, responsive to execution by a processor coupled to at least one memory device, are operable to extract one or more features of an electric current to be coupled to an electric vehicle in response to initiation of a charging process at a first charging station. The encoded instructions may additionally operate to determine one or more performance characteristics of the electric vehicle responsive to the one or more features of the electric current coupled to the electric vehicle in the charging process at the first charging station. The encoded instructions may additionally be operable to determine a charge performance model based, at least in part, on the one or more determined performance characteristics of the electric vehicle. The encoded instructions may additionally be operable to display a recommendation for at least a second charging station based, at least in part, on the charge performance model and the one or more features of the at least the second charging station.

In particular embodiments, the one or more features to be extracted from the coupled electric current include one or more of an indication of abnormalities of the coupled electric current. In particular embodiments, the extracted features may include indication of abnormalities of a voltage of the coupled electric current, an indication of abnormalities in power factor of the coupled electric current, an indication of noise content of the coupled electric current, and an indication of total harmonic distortion of the coupled electric current. In particular embodiments, the determined one or more performance characteristics of the electric vehicle may include one or more of a measure of a period of time to substantially fully charge the electric vehicle, a measure of electrical or thermal stress on one or more energy storage elements of the electric vehicle, a measure of the life of one or more energy storage elements of the electric vehicle, and a measure of the age of one or more storage elements of the electric vehicle.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, claimed subject matter may be best understood by reference to the following detailed description if read with the accompanying drawings in which:

Figure 1:
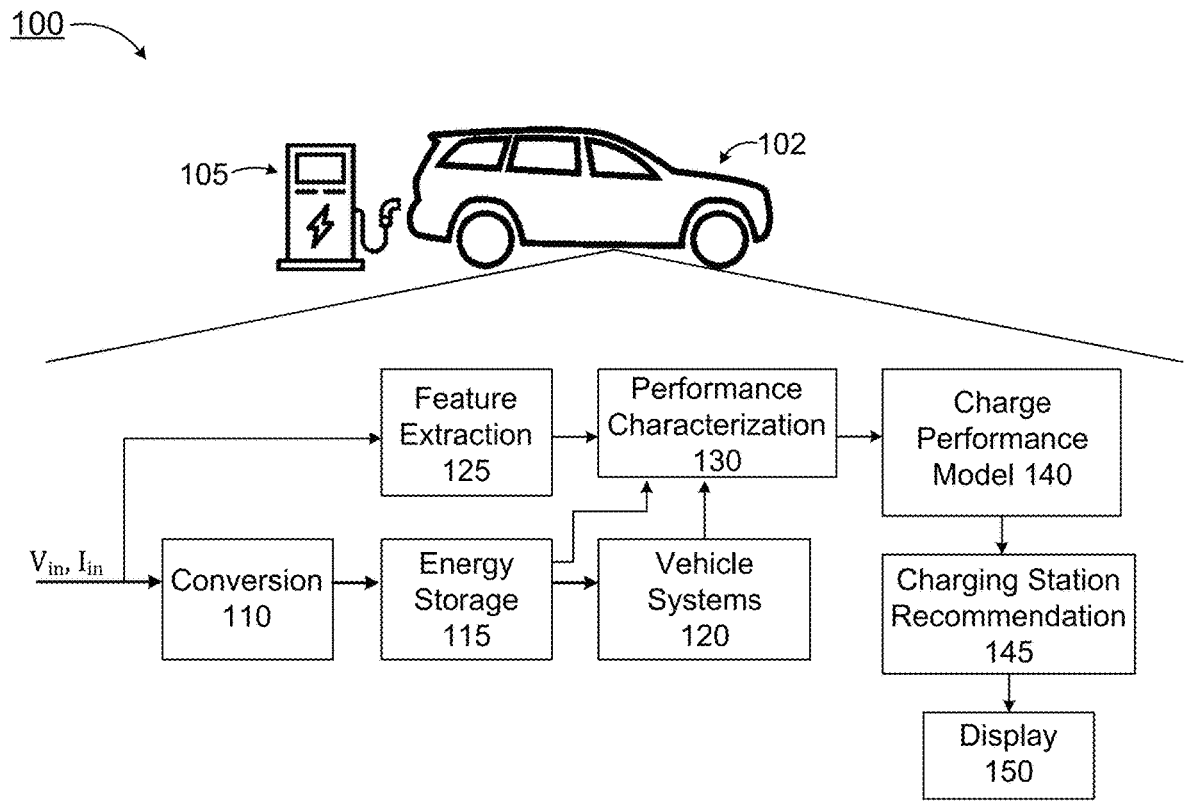
FIG. 1 is an illustration depicting electric vehicle modules that facilitate an electric vehicle charging process, according to an embodiment.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. In addition, it is to be understood that other embodiments may be utilized. Moreover, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides guidance regarding inferences to be drawn.

As previously alluded to, an operator of an electric vehicle may charge energy storage cells of the electric vehicle via a home-based charger, which operates to convert ordinary household voltage and current, for example, to a voltage and current suitable for use with an electric vehicle. Some electric vehicle manufacturers may provide differing charge voltage options, such as options to charge utilizing a 120-volt source, a 240-volt source, or a 480-volt source. However, while traveling away from a home-based charger, such as when traveling over relatively long distances, an electric vehicle may be charged at a charging station, which may be located along a highway, freeway, or other type of thoroughfare. In some instances, especially when traveling over considerable distances, an electric vehicle may require charging at several intervals throughout the day, such as, for example, intervals of perhaps between about 200 kilometers and about 400 kilometers. Thus, responsive to a need to visit charging stations, perhaps several times during a single day, it may become apparent that electric vehicle charging stations vary in available facilities, amenities, available charging voltages, and overall customer experience.

In addition, although a charging station may advertise certain aspects of the charging station, such as available charging voltages, overvoltage protections, overcurrent protections, and so forth, such claims may be suspect, unverifiable, outdated, or may be of a general nature that is not representative of the actual parameters of the charging signal provided by the charging station. Thus, an electric vehicle operator may find themselves at an electric vehicle charging station that offers charging services that are not entirely compatible with an operator's particular electric vehicle or that operate in a manner that is not optimal with respect to the particular electric vehicle. Under such circumstances, for example, an operator of an electric vehicle may wish to cancel a charging operation in favor of driving to a secondary charging site. Further, especially if energy storage cells of the electric vehicle (e.g., batteries) are in a considerably depleted state, driving the vehicle to a perhaps more desirable, secondary charging site located perhaps several kilometers from the charging station, may represent an undesirable option.

Although electric vehicle user groups may, from time to time, provide crowdsourced electric vehicle charging station reports, blogs, ratings, or other forms of feedback, such reporting may be of a general nature that may (or may not) pertain to certain, perhaps higher quality, electric vehicles. For example, even though general ratings of a particular electric vehicle charging station may be relatively low, a driver of a particular electric vehicle may find the vehicle to perform satisfactorily or even excellent in response to charging from the relatively low-rated charging station. Thus, despite the general rating of the electric vehicle charging station being relatively low, a driver of a particular electric vehicle need not be deterred from utilizing services from the relatively low-rated charging station.

Further, energy storage devices (e.g., batteries) utilized for electric vehicles may vary to the extent that certain types of energy storage devices may be more tolerant of charging voltage and current abnormalities than other types of energy storage devices. Thus, it is possible that general ratings with respect to a particular charging station are crowdsourced from groups of users operating electric vehicles utilizing a specific type of battery technology. For example, users of particular types of energy storage devices may report that charging parameters of a particular charging station negatively impact performance aspects of the electric vehicle. However, operators of electric vehicles including more advanced energy storage devices and/energy storage management systems may not experience any negative impacts whatsoever when utilizing the particular charging station. Accordingly, in many instances, it may be advantageous for a computing device (or other apparatus) of an electric vehicle to extract parameters or features of an electric current coupled from or coupled to a charging station to the electric vehicle. (In this context, the term "coupled to" refers to an electric current sent from a charging station in the direction of an electric vehicle.) The computing device may monitor or determine performance characteristics of the electric vehicle in response to the charging process in a manner that permits the computing device to determine or generate a charge performance model that may include or reflect quality data such as a charging quality indicator that is based on the charging station and/or the electric vehicle. The charge performance model may operate to relate performance characteristics of the electric vehicle to the features extracted from the electric current coupled from the charging station to the electric vehicle. In this context, the term "extracted" refers to one or more features that are generated, tracked, and/or followed over a period of time via monitoring of an electric current coupled from a charging station. The term "extracted" may also refer to a manner by which the electric vehicle, or an appropriate charging system thereof, responds to a current waveform coupled to the electric vehicle from the charging station. Thus, a feature extracted from a charging current waveform may be utilized to describe an electric current or a manner that describes how the electric vehicle is being charged. Based on the charge performance model and any history of the particular electric vehicle's performance characteristics, the computing device may be capable of displaying (or at least initiating or otherwise causing the display of) a recommendation as to whether a particular charging station can be expected to perform favorably following charging by the particular charging station. For example, the charge performance model may determine the charging duration based on the performance of the charging station and determine a recommended charging station that may be within driving range of the electric vehicle and provide faster charging capabilities.

As the term is used herein, a "charge performance model" refers to a computer model that relates various charging parameters that relate to performance aspects of an electric vehicle. Thus, for example, a charge performance model may correlate charging current and/or charging voltage (which may be coupled to an electric vehicle charging port for a threshold duration) with a certain expected electric vehicle driving range. In another example, a charge performance model may correlate radiated or conducted electrical noise and distortion present in a charging current with a likelihood of the noise or distortion producing or generating interferences with infotainment systems, onboard stereo systems, or the like. In certain examples, the charge performance model may include quality data such as a charging quality indicator based on the charging station and/or the electric vehicle Thus, for example, a computing device of an electric vehicle may determine that despite a charging station's rating, for example, the charging station may operate satisfactorily with the energy storage cells of the electric vehicle. Additionally, responsive to differing energy storage device technologies, an operator of a newer, perhaps more advanced electric vehicle may experience none of the shortcomings identified by operators of other, perhaps less-advanced electric vehicles. As a consequence, an operator of an electric vehicle may access recommendations for electric vehicle charging patient that are perhaps more accurate, with respect to the operator's particular electric vehicle, than more general recommendations applicable to a population that includes all types of electric vehicles.

The computing device may direct the driver to a recommended charging station based on a parameter from a charging process, a request by the user via the navigation system, and/or the age of the electric vehicle. In addition, as an electric vehicle ages, the vehicle may exhibit particular trends with respect to changes in charging processes of energy storage devices (e.g., batteries) such as the state of the battery and/or charging process. For example, based, at least in part, on energy storage devices of an electric vehicle developing increasing internal resistances as the devices age, a computing device coupled to a battery management system may recommend an optimal electric charging station that consistently maintains voltage and current waveforms that are free from voltage and current dropouts, voltage and current spikes, distortions of charging waveforms, or the like. Further, in view of increasing internal resistances, a computing device of an electric vehicle may recommend that although charging may be possible at an increased voltage, such charging may not be recommended for an electric vehicle of a certain age, since internal battery resistances may bring about excessive heat stress and/or electrical stress within energy storage devices. It may be appreciated that such charging station recommendations may operate to extend the useful life of energy storage devices by directing electric vehicle operators to select charging stations that provide optimal current and voltage waveforms, which may be more suited for older storage devices.

Thus, in particular embodiments, a computing device of an electric vehicle may direct an operator of the electric vehicle to a charging station that has been recommended as being optimal for the particular electric vehicle. A recommendation for an optimal charging station for use with a particular electric vehicle may be arrived at empirically, such as via real-time current and voltage measurements performed by one or more computing devices of the electric vehicle during past charging processes. Such direction may occur via an audio message and/or via one or more indicators overlaid on a digitized map presented to an operator of the electric vehicle. Thus, at least in certain embodiments, an electric vehicle operator may be assured that a recommended charging station is at least highly likely to provide charging current and voltage waveforms that are optimal for the particular electric vehicle. In an example, which may be applicable to an aging electric vehicle, one or more processors of an electric vehicle may recommend a charging station based, at least in part, on the charging station's performance in providing lower-voltage, lower-current charging waveforms, which may be more suitable for use with older onboard energy storage devices. Such a recommendation may be at odds with recommendations for the charging station, which may be based on the charging station's performance in providing higher-voltage or higher-current charging waveforms. The charging station recommendations may be based on the charge performance model that may include quality data such as a charging quality indicator based on the charging station and/or the electric vehicle.

In some instances, selection of an optimal charging station for a particular electric vehicle may be based on an operator's desire to visit a charging station and to arrive at a certain destination within a certain period of time. In one possible example, an operator of an electric vehicle may wish to obtain a charge for the electric vehicle and to arrive at a destination within one hour. Thus, in particular embodiments, a computing device of an electric vehicle may determine that despite the vehicle's proximity to a first charging station, which permits charging at a relatively slower rate, it may be advantageous to travel some distance to a second charging station so that the electric vehicle can be charged at a relatively fast rate, thus ensuring that the operator can charge the vehicle and arrive at the destination within an allotted time. In another example, a computing device of an electric vehicle may recommend a charging station that may be suboptimal for a particular electric vehicle but is along a route to a destination. Thus, in such an instance, selection of a charging station for a particular electric vehicle may represent a balance between a desire to optimally charge the particular electric vehicle and to reach a destination within a desired period of time.

In particular embodiments, a charging station recommendation for an electric vehicle may be accomplished through the utilization of a charging management system and/or a battery management system. A system such as a battery management system, which may include battery monitoring equipment already installed as standard equipment on an electric vehicle, may operate via real-time monitoring of a charging waveform. As described below, such real-time monitoring may include monitoring of current and/or voltage transients, current and/or voltage dropouts, current and/or voltage signal amplitude in relation to upper and lower thresholds, noise content of current and/or voltage waveforms, relative phasing of current and/or voltage waveforms (e.g., for alternating current charging signals), and numerous other possible measurable anomalies/abnormalities present on the charging waveform. It should be noted that claimed subject matter is intended to embrace any and all anomalies/abnormalities on charging waveforms virtually without limitation. Also as described below, measurements may be compiled over a period of time so as to facilitate determination of charging trends with respect to particular charging stations operating with a certain electric vehicle. Additionally, measurements may be uploaded or otherwise conveyed to a cloud-based repository, which may include measurements from other, perhaps similar electric vehicles (e.g., electric vehicles of a certain make and model) so as to facilitate tailored recommendations of charging stations suitable for the particular electric vehicles. A cloud-based repository may utilize various processing approaches, such as use of a neural network, for example, which may facilitate machine learning so as to provide recommendations for optimal charging stations for a wide variety of electric vehicles.

In an embodiment, an electric vehicle may include one or more computing devices for controlling various functionality on the vehicle. Examples of the computing device (also referred to as a controller) include at least one of: an electronic control unit (ECU), an infotainment system controller (e.g., an infotainment head-unit), a telematics control unit (TCU), a central powertrain controller (CPC), a central driving and charging controller (CDCC), a centralized vehicle computer, a zone controller, or any other controller. In some instances, the computing device may include one or more processors (also referred to as processing circuits). These processors may include one or more microprocessors, one or more processing cores, a programmable logic circuit (PLC) or a programmable logic/gate array (PLA/PGA), a field programmable gate array (FPGA), an application specific integrated circuit (ASIC), a system-on-chip (SoC) controller having one more chiplets, or any other control circuit.

In some implementations, the computing device may include, or may be in communication with, a memory, also referred to as a memory device or a non-transitory computer-readable medium or non-transitory storage mechanism. Memory devices are discussed in more detail with respect to FIG. 8. In some cases, the non-transitory computer-readable medium may store computer-executable instructions or computer-readable instructions (also referred to more simply as instructions), such as instructions to perform the method of FIG. 7.

In various embodiments, the terms "computer-readable instructions" and "computer-executable instructions" are used to describe software instructions or computer code configured to carry out various tasks and operations. In various embodiments, if the computer-readable or computer-executable instructions form software modules, the term software module refers broadly to a collection of software instructions or code configured to cause the processor of the computing device to perform one or more functional tasks. The software modules and computer-readable/executable instructions may be described as performing various operations or tasks when a processor or other hardware component is executing the software modules or computer-readable instructions. When the computing device is part of an electric vehicle, the software modules may also be referred to as electric vehicle software modules.

FIG. 1 is an illustration depicting electric vehicle software and/or hardware modules that facilitate an electric vehicle charging process, according to an embodiment 100. The modules include a conversion module 110, a feature extraction module 125, an energy storage module 115, a performance characterization module 130, and a charging station recommendation module 145. In the embodiment of FIG. 1, charging station 105 represents a source of electric current, such as alternating current, direct-current, or may be capable of providing both types of charging currents, and claimed subject matter is not limited in this respect. Charging station 105 may provide a capability to couple current to electric vehicle 102 via conductors that mate with, or at least come into electrical contact with, corresponding conductors at a receptacle of electric vehicle 102. In particular embodiments, charging station 105 may provide differing voltage levels, such as levels corresponding to 120 volts, 240 volts, 480 volts, or other voltage, which may enable electric vehicle 102 to be charged at a relatively slow rate, a medium rate, or a relatively fast rate. In particular embodiments, charging station 105 may provide an electric charge to electric vehicle 102 for a fee, wherein such fee is assessed based, at least in part, on the level or value of the charging voltage and/or charging current supplied.

In FIG. 1, conversion module 110 may obtain electric power (e.g., $V_{in}$, in) from charging station 105. It should be noted that conversion module 110 may operate to convert a direct-current signal of a first voltage to a direct-current signal of a second voltage, or may operate to convert an alternating current signal of a first voltage to a direct-current signal of a second voltage, and claimed subject matter is not limited in this respect. Current conducted from charging station 105 may be conveyed to energy storage module 115, which may include any type of energy storage technology. In particular embodiments, energy storage module 115 may represent a plurality of cylinder-shaped batteries or a plurality of prismatic-shaped batteries, such as batteries including a shape of a right rectangular prism. In particular embodiments, energy storage module 115 may incorporate any type of energy storage technology, such as batteries including lithium-ions, lead-acid, or batteries/chemical energy storage devices including any other materials and/or compounds, and claimed subject matter is not limited in this respect. In particular embodiments, energy storage 115 may also include low-voltage storage, such as energy storage cells providing a voltage output signal of between about 10 volts and about 14 volts (e.g., a nominal 12-volt output), just to name a few non-limiting examples. In particular embodiments, energy storage 115 may additionally include higher voltage storage, such as energy storage cells providing an output voltage of between about 12 volts and about 60 volts (e.g., nominal 36 volts or 48 volts), just to name a few non-limiting examples.

Energy storage module 115 may provide primary power to various electric vehicle systems as represented by vehicle systems 120 in FIG. 1. Vehicle systems may include drive systems, infotainment systems, lighting systems, battery management systems, antilock braking systems, autonomous driving systems, sensors and measurement devices, heating, ventilation, and air conditioning systems, and so forth. These systems may be controlled by the one or more computing devices described above, wherein the one or more computing devices may be controllers embedded in the electric vehicle 102. In some implementations, the one or more computing devices may also be executing and/or controlling various modules in FIG. 1, such as the feature extraction module 125 or the performance characterization module 130. Although not explicitly shown in FIG. 1, vehicle systems 120 may additionally include electric power conditioning modules, such as DC to AC conversion modules, which may be employed to drive various machinery on board electric vehicle 102, such as coolant pumps, fans, air conditioning compressors, and so forth. Feature extraction module 125 may sample voltage and current input coupled to conversion module 110. Such sampling may determine various parameters, which may be described in greater detail in reference to FIGS. 2-4, of voltage and current input signals to conversion module 110.

Performance characterization module 130 may operate to characterize performance parameters of various vehicle systems and components, such as those corresponding to vehicle systems 120, in response to charging of electric vehicle 102. Thus, for example, performance characterization module 130 may characterize performance, such as range performance of one or more drive systems and battery charge level as a function of time, of electric vehicle 102. Performance characterization module 130 may additionally receive signals from energy storage modules 115, such as during a process of charging one or more energy storage modules. Thus, for example, responsive to a charging process bringing about thermal stress (e.g., increases in battery temperature), performance characterization module 130 may record the occurrence of such an event. Performance characterization module 130 may additionally record occurrence of erratic or abnormal operation of one or more other components of vehicle systems 120, which may occur in response to anomalies/abnormalities in charging signals (e.g., $V_{in}$, $I_n$) from charging station 105.

Performance characterization module 130 may communicate with charge performance model 140, which may operate to build a computer-implemented model of electric vehicle 102. In this context, a computer-implemented "model" refers to a an arrangement of parameters, such as encoded within a two-dimensional array of a computer memory device, which describe performance of a charging operation with respect to a charging waveform and/or an electric vehicle's response to a charging waveform. Thus, for example, a computer-implemented model may describe a relationship or a correlation between a first grouping of one or more parameters of a current and/or voltage waveform coupled from a charging device to an electric vehicle and, for example, a charge performance and/or battery performance, which may include battery electrical/thermal stresses in response to a charging waveform. In another example, a computer-implemented model may describe overall vehicle performance characteristics, such as driving range relative to or, in correlation with, a first grouping of one or more parameters of current and voltage waveforms coupled from the charging device to an electric vehicle.

In particular embodiments, a computer-implemented model may include input parameters, such as features extracted from charging signals $V_{in}$, $I_{in}$, which may give rise to output parameters, such as indicators of battery electrical/thermal stresses, vehicle driving range, indicators of erratic/abnormal operation of one or more of vehicle systems 120, and so forth. For example, a charge performance model may indicate that a particular electric vehicle that is charged utilizing a relatively low voltage (e.g., about 120 volts) gives rise to a vehicle driving range of 300 kilometers while use of a somewhat higher voltage (e.g., about 240 volts) gives rise to a vehicle driving range of 285 kilometers. The charge performance model 140 may determine or indicate quality data such as a charging quality indicator based on the charging station 105 and/or the electric vehicle 102. Based, at least in part, on charge performance model 140, charging station recommendation 145 may be determined by the computing device, which may cause the recommendation 145 to be displayed (e.g., via display 150). A charging station recommendation may include of an alphanumeric message and/or graphics and/or other content, such as by way of a vehicle display, to indicate a nearby charging station capable of providing 120-volt charging signals.

Figure 2:
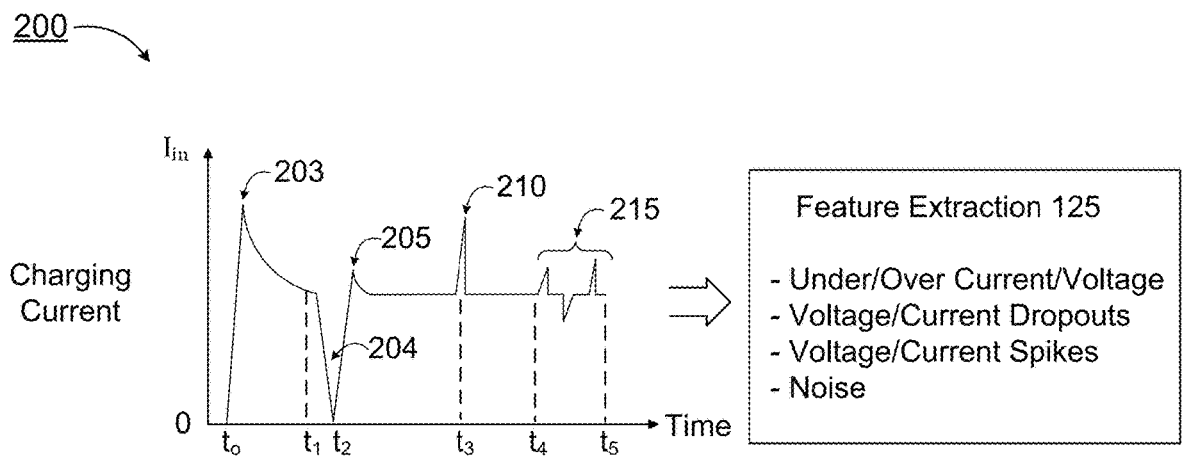
FIGS. 2 and 3 are illustrations depicting particular features of voltage/current waveforms encountered at an electric vehicle charging station, according to embodiments.
Figure 3:
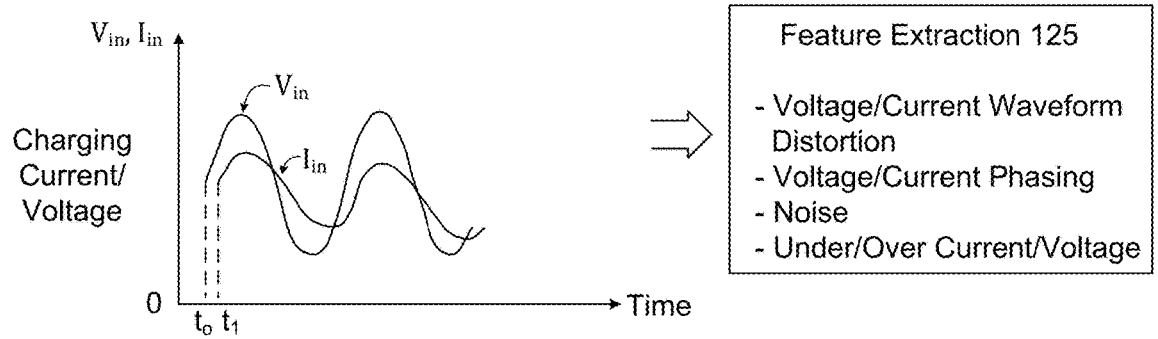

In some implementations, a computing device in the electric vehicle may extract a feature of an electric current via monitoring, in response to the vehicle being charged at a charging station, a current waveform of the electric vehicle. For example, the computing device may execute the feature extraction module to extract features of the electric current. FIGS. 2 and 3 are illustrations depicting particular features of a current waveform encountered at an electric vehicle charging station, according to embodiments. It should be noted that although FIG. 2 depicts a conducted current signal, a voltage signal can be substituted for the conducted current signal, and claimed subject matter is intended to embrace anomalies and other types of features of either conducted current signals or applied voltage signals from charging station 105. In embodiment 200 (of FIG. 2), charging signal $I_{in}$ is shown as beginning at a level that approaches 0.0 volts DC at time to and quickly rises to current peak 203. Current peak 203 may represent an inrush current that is conducted immediately after activating charging station 105 (of FIG. 1). However, it may be appreciated that large inrush currents may bring about damage to conversion module 110 and/or energy storage module 115. After rising to current peak 203, a conducted current may decrease to a more nominal level, such as given by $t_1$ in FIG. 2.

At a time between $t_1$ and $t_2$ current conducted from charging station 105 to electric vehicle 102 may experience momentary dropout 204, followed by a second current peak 205. Although second current peak 205 may not include an amplitude equivalent to that of current peak 203, the second current peak nonetheless may bring about damage to electronic components and systems of electric vehicle 102. After returning to a nominal current level, current conducted from charging station 105 may include current spike 210. In the embodiment of FIG. 2, current spike 210, which may occur at $t_3$, may result from an anomaly of charging station 105 such as a relatively sudden decrease in current conducted by other charging stations of an electric car charging facility.

Also as shown in FIG. 2, from time $t_4$ to time $t_5$, a conducted current may include noise signals 215. Noise signals 215 may result from inadequate and/or insufficient filtering of direct-current signals provided by charging station 105. In particular embodiments, noise signals 215, if of sufficient amplitude, may be coupled into delicate electronic systems in the form of radiated or conducted interference signals.

FIG. 3 is an illustration depicting particular features of an alternating current waveform supplied by a charging station to an electric vehicle charging station, according to an embodiment 300. As shown in FIG. 3, a charging station may supply a voltage waveform, as indicated by $V_{in}$, and a current waveform, as indicated by $I_{in}$. It may be appreciated that for substantially resistive loads, voltage waveform $V_{in}$ and current waveform $I_{in}$ may be in phase with each other. However, responsive to electric vehicle 102 including a reactive mode, and/or responsive to an anomaly of charging station 105, voltage waveform $V_{in}$ and current waveform $I_{in}$ may be out of phase with each other. In such instances, it may be appreciated that the power coupled from charging station 105 to electric vehicle 102 may not be representative of maximum power transfer (or at least power transfer that is above a threshold) from charging station 105 to electric vehicle 102. In particular embodiments, out of phase current and voltage signals may be measured by a time difference ($t_0$ to $t_1$), such as in seconds or in degrees of phase angle, between a voltage waveform $V_{in}$ and a current waveform $I_{in}$. In particular embodiments, out of phase current and voltage signals may contribute to a decrease in the power factor of a charging signal coupled to electric vehicle 102. Although not explicitly in FIG. 3, voltage waveform $V_{in}$ and current waveform $I_{in}$ may additionally include a noise signal component, which may include harmonics of, for example, voltage waveform $V_{in}$.

Thus, in particular embodiments, as indicated in FIGS. 2 and 3, feature extraction module 125 may operate to detect undercurrent (i.e., a conducted current that is less than a predetermined threshold), overcurrent (i.e., a conducted current that is greater than a predetermined threshold), undervoltage (i.e., an applied voltage that is less than a predetermined threshold), and overvoltage (i.e., an applied voltage that is greater than a predetermined threshold) in a charging signal from a charging station. Feature extraction module 125 may additionally operate to detect voltage dropouts (i.e., a momentary, significant drop in voltage) and may operate to detect current dropouts (i.e., a momentary, significant drop in current) in a charging signal from a charging station. Feature extraction module 125 may additionally operate to detect voltage spikes (e.g., a momentary, significant increase in voltage) and may operate to detect current spikes (i.e., a momentary, significant increase in current) in a charging signal from a charging station. Feature extraction module 125 may additionally operate to detect noise signals coupled onto a charging signal from a charging station. Feature extraction module 125 may additionally operate to detect voltage/current waveform distortion, voltage/current waveform out-of-phase conditions, voltage/current waveform noise content, and voltage/current under/over voltage in an alternating current signal. Feature extraction module 125 may operate to detect additional features of an alternating current signal or a direct current signal coupled from a charging station to electric vehicle 102, and claimed subject matter is not limited in this respect. Feature extraction module 125 may assign a weighting factor, which may facilitate emphasis of certain parameters with respect to other parameters. For example, electrical or thermal stresses on one or more energy storage devices (e.g., batteries) may be more heavily weighted in relation to driving range since, for example, excessive electrical or thermal stresses may give rise to permanent damage of energy storage modules. In contrast, a small decrease in driving range, which may be less heavily weighted, may represent a mere inconvenience.

Figure 4:
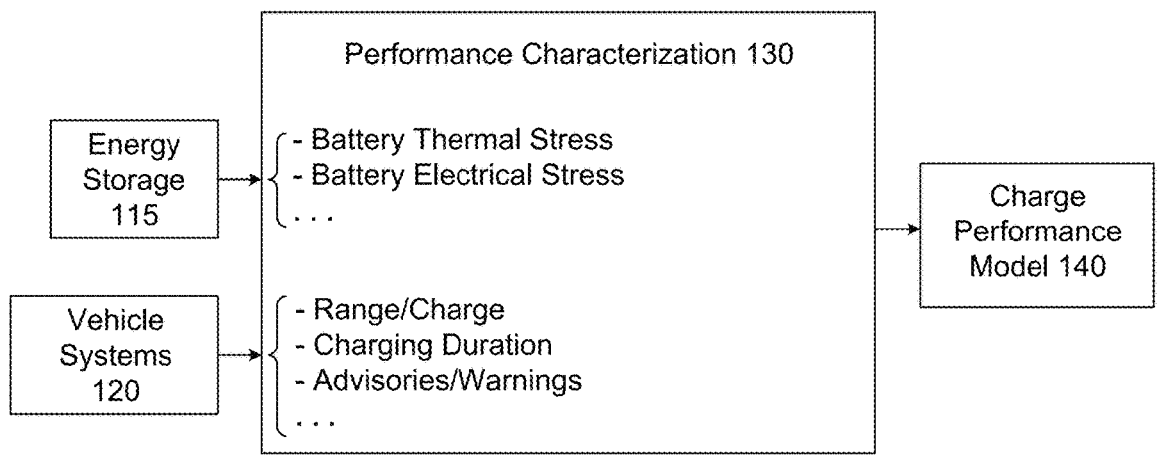
FIG. 4 is an illustration depicting energy storage modules and vehicle systems coupled to a performance characterization module of FIG. 1, according to an embodiment.

FIG. 4 is an illustration depicting energy storage modules 115 and vehicle systems 120 coupled to a performance characterization module 130 of FIG. 1, according to an embodiment 400. As depicted in FIG. 4, features related to energy storage devices 115, which may convey parameters indicative of, for example, battery thermal stress, battery electrical stress, or parameters indicative of other potentially damaging stresses, may operate as input signals to performance characterization module 130. Also as depicted in FIG. 4, features related to vehicle systems 120, such as driving range achieved based, at least in part, on a particular charging operation, a duration or period of time required to perform a charging process, and any advisories/warnings provided by one or more computing devices of an electric vehicle 102 during the charging process may be utilized by performance characterization module 130 to determine a charge performance model 140 (of FIG. 1). Performance characterization module 130 may determine one or more performance characteristics of an electric vehicle based, at least in part, on the one or more extracted features of the electric current described above.

Figure 5:
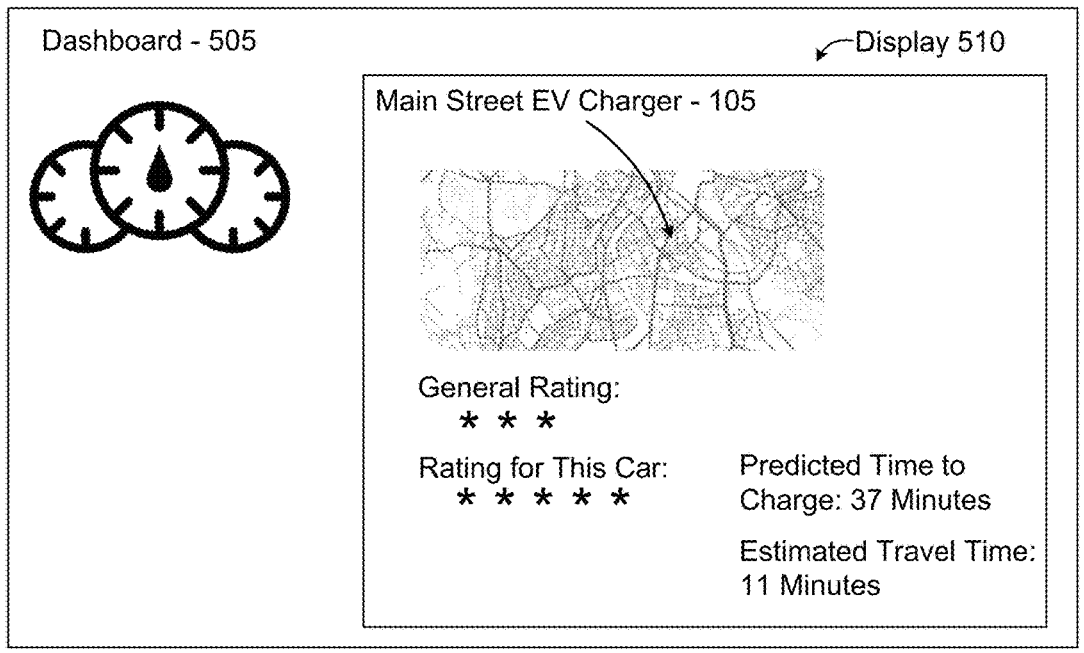
FIG. 5 is an illustration depicting portions of a dashboard display of an electric vehicle, according to an embodiment.

FIG. 5 is an illustration depicting portions of a dashboard display of an electric vehicle, according to an embodiment 500. In the embodiment of FIG. 5 dashboard 505 may include various gauges and meters, such as speedometer, tachometer, warning indicators, etc. as well as a multifunction display 510. Multifunction display 510 may display digitized maps, which may indicate, among other things, locations of charging stations, such as charging station 105 of FIG. 1. A displayed location of a charging station 105 may correspond to an optimal charging station for a particular electric vehicle. As shown in FIG. 5, a particular charging station 105 (e.g., "Main Street EV Charger") may include a general rating, which may include a rating arrived via feedback from operators of various types of electric vehicles. As shown in FIG. 5, such a general rating includes 3 stars (e.g., General Rating: *), which may correspond to a slightly above average rating. However, as is also shown in FIG. 5, for a particular electric vehicle, such as electric vehicle 102, a charging station 105 may include a rating of 5 stars (e.g., Rating for This Car: ***), which may indicate that a charger at the location corresponding to the Main Street EV Charger may perform well above average when operated with specific electric vehicle 102. For example, the rating for the electric vehicle 102 may be based on a charging quality indication from collected, charging quality data from electric vehicle(s) and/or operator(s). Such operation may include such factors as increased driving range, minimal thermal and/or electrical stresses on energy storage devices, a relatively short period of time to obtain a full charge, and potentially numerous other factors. Also as shown in FIG. 5, display 510 may display a predicted time to charge. Display 510 may additionally display a predicted travel time to reach the selected charging station.

Figure 6:
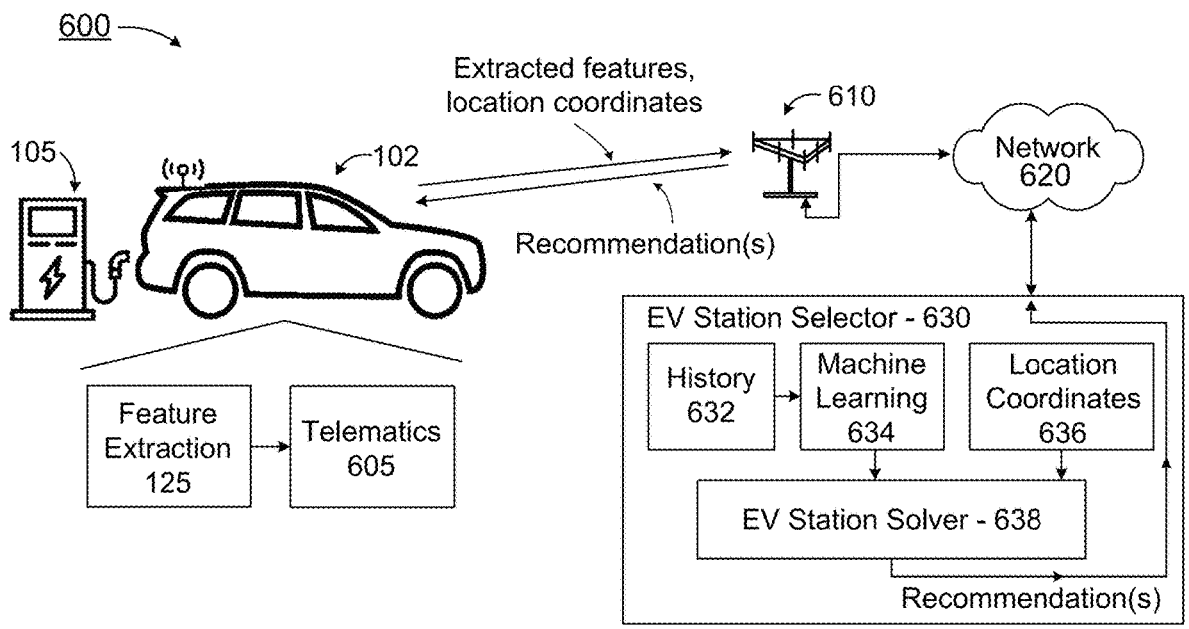
FIG. 6, is an illustration depicting certain electric vehicle modules involved in a feature extraction process and an electric vehicle station selector, according to an embodiment.

In an embodiment, charging station recommendation module 145 of FIG. 1 may be configured to generate a recommendation for a charging station, as discussed above. FIG. 6 illustrates an example in which the charging station recommendation module 145 is implemented as an electric vehicle station selector 630. More specifically, FIG. 6 is an illustration depicting certain electric vehicle modules involved in a feature extraction process and an electric vehicle station selector 630, according to an embodiment 600. As shown in the embodiment of FIG. 6, feature extraction module 125 may communicate with telematics module 605, to wirelessly communicate features extracted from a charging current/voltage signal coupled from charging station 105 to electric vehicle 102. In particular embodiments, such communication may include parameters of direct current and/or alternating current waveforms such as those described in reference to FIGS. 2-4, herein. Telematics module 605 may operate to communicate other parameters relevant to electric vehicle 102, such as present location, charge status, vehicle operating parameters, and claimed subject matter is intended to embrace all such additional parameters.

Wireless communication signals may be received via wireless transceiver 610, which may represent a cellular base station of a cellular network. Examples of cellular network technologies that may facilitate a wireless communications link between electric vehicle 102 and wireless transceiver 610 may include GSM, Code Division Multiple Access (CDMA), Wideband CDMA (WCDMA), Long Term Evolution (LTE), High Rate Packet Data (HRPD).

GSM, WCDMA, and 5G. Alternatively, wireless transceiver 610 may represent a Wireless Fidelity (Wi-Fi) Access point, a femtocell, a home base station, small cell base station, a Home Node B (HNB) or Home eNodeB (HeNB), which may provide access to a wireless local area network (WLAN, e.g., IEEE 802.11 network), a wireless personal area network (WPAN, e.g., Bluetooth® network), for example, and claimed subject matter is not limited in this respect.

Wireless transceiver 610 may communicate, such as by way of network 620, with electric vehicle station selector 630, which may include a computing platform, such as a server, or any other type of computer including at least one processor coupled to one or more memory devices. Network 620 may include any number of subnetworks, localized ethernet networks, or may include any other networking technology now developed or to be developed at a future time.

In particular embodiments, the electric vehicle station selector 630 may be configured to generate a charging station recommendation via a machine learning operation. For example, the selector 630 may include, for example, a neural network, which may perform one or more machine learning processes as represented by a machine learning module 634. In some implementations, the neural network may be a convolutional neural network that includes convolutional layers, such as 5 convolutional layers, as well as fully connected layers, such as 3 fully connected layers, and rectification layers. A neural network may operate to provide heuristics, which may operate to utilize historical instances of charging station parameters and their effects on charge performance models 140 for vehicles similar, at least in certain respects, to electric vehicle 102. A neural network of electric vehicle station selector 630 may operate to receive parameters from history module 632, and extend such parameters to apply to electric vehicle 102.

Electric vehicle station selector 630 may additionally include location coordinates module 636, which may operate to obtain location coordinates such as positioning signals from GPS satellites and/or from elements of a cellular communications infrastructure, such as wireless transceiver 610. Based, at least in part, on such positioning signals, and on input signals from machine learning module 634, electric vehicle station solver 638 may determine an optimal charging location for electric vehicle 102, which may include a charging quality indicator based on one or more features of the charging station and/or the electric vehicle. Determination of an optimal charging location for a particular electric vehicle may be based on an electric vehicle operator's need and/or desire to visit a charging station and to arrive at a certain destination within a predetermined period of time. Thus, in particular embodiments, machine learning module 634 of electric vehicle station selector 630 may determine that despite the vehicle's proximity to a first charging station, which permits charging at a relatively slower rate, it may be advantageous to travel some distance to a second charging station so that the electric vehicle 102 can be charged at a relatively faster rate, thus ensuring that the operator can charge the electric vehicle 102 and arrive at the destination within an allotted time. In another example, a computing device of an electric vehicle 102 may recommend a charging station that may be suboptimal for a particular electric vehicle but is along a route to a destination. Thus, in such an instance, electric vehicle station solver 638 may select a charging station for a particular electric vehicle 102 that represents a balance between a desire to optimally charge the particular electric vehicle and/or to reach a destination within a desired period of time.

Figure 7:
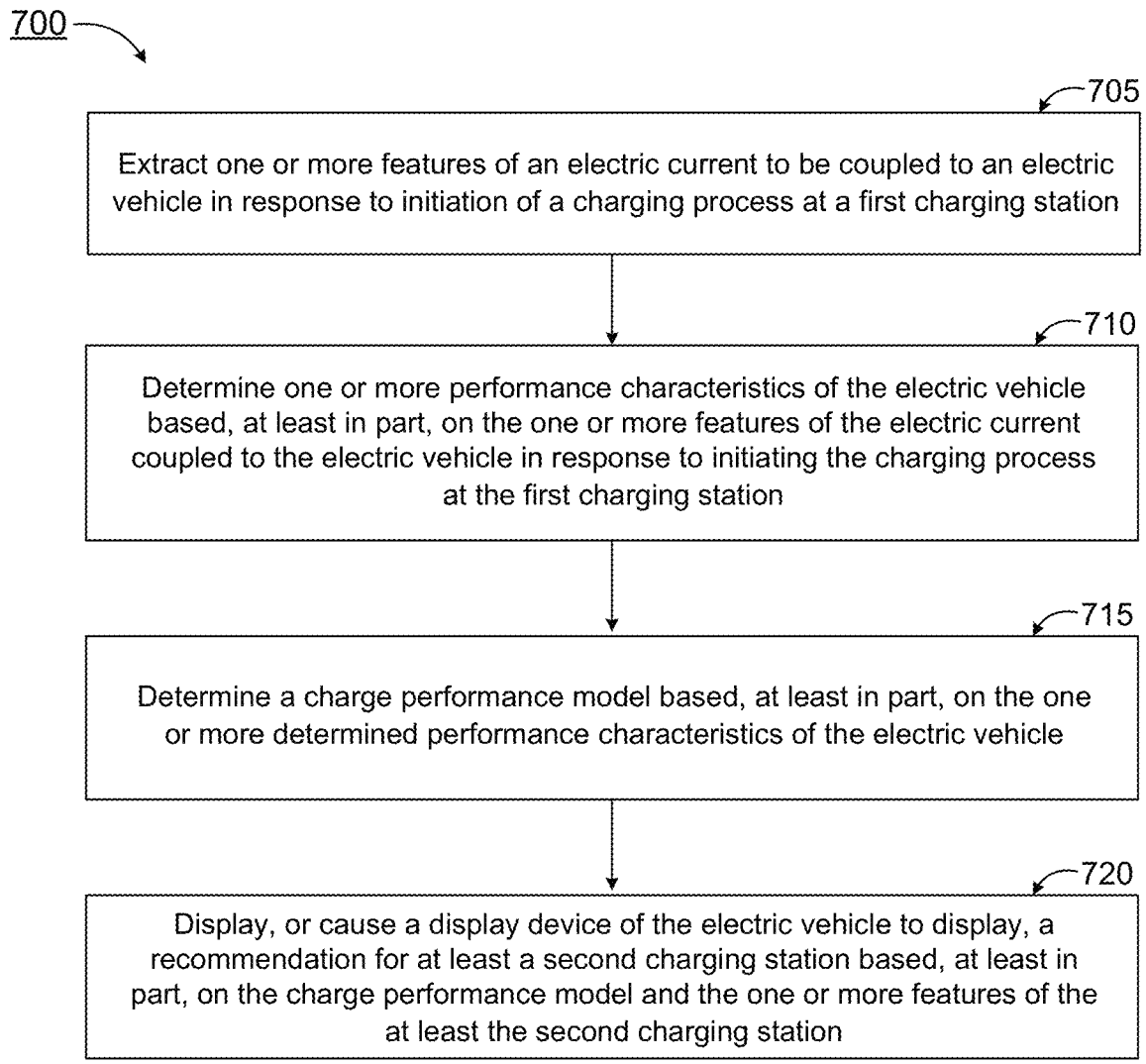
FIG. 7 depicts a flow diagram of example processes for feature extraction during a process of charging an electric vehicle, according to embodiments.

FIG. 7 depicts a flow diagram of example processes for feature extraction during a process of charging an electric vehicle, according to an embodiment 700. It should be noted that claimed subject matter is intended to embrace all of the actions depicted at 705-720, fewer actions than those depicted at 705-720, and/or more actions than those depicted at 705-720. In some cases, the method may be performed by a computing device or other apparatus, such as when a processor of the computing device executes instructions stored on a non-transitory computer-readable medium. The embodiment of FIG. 7 may begin at 705, which may include extracting of one or more features of an electric current coupled to an electric vehicle in response to initiation of a charging process at a first charging station. Features of an electric current may include features of a conducted current and/or an applied voltage. Features of a conducted direct current may include, for example, current dropouts, current spikes, current noise and distortion, and other anomalies/abnormalities as described herein, such as with respect to FIGS. 2-4. Features of an applied voltage may include, for example, voltage dropouts, voltage spikes, voltage noise and distortion, and other anomalies as described herein, such as with respect to FIGS. 2-4. Features of a conducted alternating current may include phase lag of a current waveform with respect to a voltage waveform or phase lag of a voltage waveform with respect to a current waveform. Other features of a conducted alternating current may include harmonic distortions, or any other current anomalies, and claimed subject matter is not limited in this respect.

The method of FIG. 7 may continue at 710, which may include a computing device determining one or more performance characteristics of the electric vehicle based, at least in part, on the one or more features of the electric current coupled to the electric vehicle in response to initiating the charging process at the first charging station, such as those determined at 705. In particular embodiments, performance characteristics may include, for example, electric vehicle driving range realized responsive to a charging process, battery thermal and/or electrical stresses responsive to battery charging, anomalies in operation of infotainment systems, navigation systems, or any other vehicle system.

The method may continue at 715, which may include determining a charge performance model based, at least in part, on one or more determined performance characteristics of the electric vehicle, such as those determined at 710. In particular embodiments, a charge performance model may include input signal descriptions, which may correspond to features extracted from a charging electric current/voltage, and output signal descriptions, which may correspond to operating characteristics of a particular electric vehicle and/or its component vehicle systems. For example, the charge performance model may include quality data such as a charging quality indicator based on the charging station and/or the electric vehicle.

The method may continue at 720, which may include displaying, or causing a display device to display, a recommendation for at least a second charging station. The recommendation may be generated (e.g., by the computing device) based, at least in part, on the charge performance model and the one or more features of the at least the second charging station. In particular embodiments, 720 may include recommending a charging station that, perhaps, includes a relatively low general rating as assigned by a general population of electric vehicle operators as shown in FIG. 5. As previously discussed herein, a charging station having a relatively low rating for certain electric vehicles, may operate satisfactorily for other, perhaps higher-quality, electric vehicles. Also as previously discussed herein, a charging station having a relatively high rating for certain electric vehicles may bring about battery electrical and/or thermal stresses when utilized to charge aging electric vehicles, perhaps having higher internal battery resistances. Thus, despite a charging station having a relatively high rating, the charging station may not be entirely suitable for certain (e.g., aging) electric vehicles.

Figure 8:
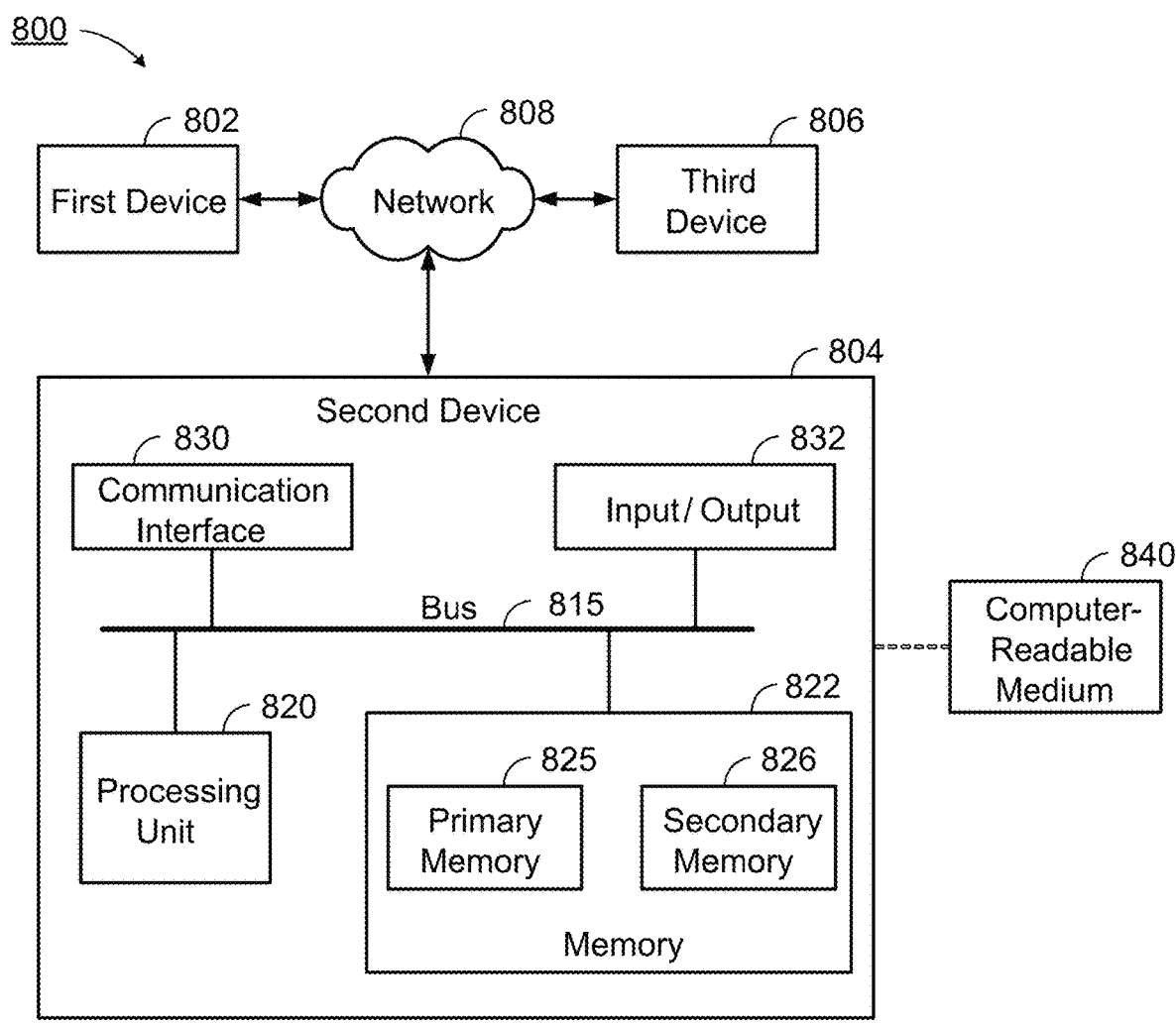
FIG. 8 is a schematic block diagram illustrating an example computing system environment, according to an embodiment.

FIG. 8 is a schematic block diagram illustrating an example computing system environment, according to an embodiment. FIG. 8 is a diagram showing a computing environment, according to an embodiment 800. The embodiment of FIG. 8 may correspond to a computing environment that performs the functionality of feature extraction module 125, performance characterization module 130, charge performance model 140, and charging station recommendation 145 as described with respect to FIG. 1. In the embodiment of FIG. 8, first and third devices 802 and 806 may be capable of rendering a graphical user interface (GUI) for use in displaying a recommendation for a charging station. In FIG. 8, computing device 802 ('first device' in FIG. 8) may interface with computing device 804 ('second device' in FIG. 8), which may, for example, also include features of a client computing device and/or a server computing device, in an embodiment. Processor (e.g., processing device) 820 and memory 822, which may include primary memory 825 and secondary memory 826, may communicate by way of a communication interface 830, for example, and/or input/output module 832. The term "computing device," or "computing resource" in the present patent application, refers to a system and/or a device, such as a computing apparatus that includes a capability to process (e.g., perform computations) and/or store digital content, such as electronic files, electronic documents, measurements, text, images, video, audio, etc., in the form of signals and/or states. Thus, a computing device, in the setting or environment of the present patent application, may include hardware, software, firmware, or any combination thereof (other than software per se). Computing device 804, as depicted in FIG. 8, is merely one example, and claimed subject matter is not limited in scope to this particular example.

In FIG. 8, computing device 802 may provide one or more sources of executable computer instructions in the form of physical states and/or signals (e.g., stored in memory states), for example. Computing device 802 may communicate with computing device 804 by way of a wired or wireless network connection, such as via network 808, for example. As previously mentioned, a connection, while physical, may be virtual while not necessarily being tangible. Although computing device 804 of FIG. 8 shows various tangible, physical components, claimed subject matter is not limited to a computing devices having only these tangible components as other implementations and/or embodiments may include alternative arrangements that may include additional tangible components or fewer tangible components, for example, that function differently while achieving similar results. Rather, examples are provided merely as illustrations. It is not intended that claimed subject matter be limited in scope to illustrative examples.

Memory 822 may include any non-transitory storage mechanism. Memory 822 may include, for example, primary memory 825 and secondary memory 826, additional memory circuits, mechanisms, or combinations thereof may be used. Memory 822 may include, for example, random access memory, read only memory, etc., such as in the form of one or more storage devices and/or systems, such as, for example, a disk drive including an optical disc drive, a tape drive, a solid-state memory drive, etc., just to name a few examples. Examples of the memory include a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

Memory 822 may include one or more articles utilized to store a program of executable computer instructions. For example, processor 820 may fetch executable instructions from memory and proceed to execute the fetched instructions. Memory 822 may also include a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), including, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also include a machine-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted that an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Example devices in FIG. 8 may include features, for example, of a client computing device and/or a remote/server computing device, in an embodiment. It is further noted that the term computing device, in general, whether employed as a client and/or as a server, or otherwise, refers at least to a processor and a memory connected by communications bus 815. A "processor," for example, is understood to refer to a specific structure such as a central processing unit (CPU) of a computing device which may include a control unit and an execution unit, and/or any of the other examples discussed above (e.g., SoC, ASIC). In an aspect, a processor may include a device that interprets and executes instructions to process input signals to provide output signals. As such, in the context of the present patent application at least, computing device and/or processor are understood to refer to sufficient structure within the meaning of 35 USC § 112(f) so that it is specifically intended that 35 USC § 112(f) not be implicated by use of the term "computing device," "processor" and/or similar terms; however, if it is determined, for some reason not immediately apparent, that the foregoing understanding cannot stand and that 35 USC § 112(f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-7 and in the text associated with the foregoing figure(s) of the present patent application.

In some implementations, obtaining measurements from sensors and/or measurement devices may include obtaining a particular set of parameters in accordance with one or more specified parameters may include ordering a particular set of data elements with respect to distance from a specified point along a specified axis and/or trajectory within the particular spatial coordinate system, for example. Also, in implementations, obtaining output signals from sensors and/or measurement devices may include selecting the particular set of data elements based at least in part on a specified range of distance from a specified point along a specified axis and/or trajectory within a particular spatial coordinate system, for example.

Further, for example, obtaining output signals from sensors and/or measurement devices in accordance with one or more specified parameters may include grouping individual parameters of the particular set of data elements into a plurality of subsets based at least in part on particular individual parameters that describe or characterize a signal from a charging station. Also, in implementations, processing of output signals from sensors and/or measurement devices may include ordering a plurality of subsets with respect to distance of the respective grid cells from a specified point along a specified axis and/or trajectory within the particular spatial coordinate system, for example. In implementations, obtaining output signals from sensors and/or measurement devices may include selecting the particular data elements based at least in part on a specified period of time and may also include ordering the particular set of data elements with respect to temporal proximity to a specified point in time, for example.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path including metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume the value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively include a sum of at least two components. Thus, for a given measurement, for example, one component may include a deterministic component, which in an ideal sense, may include a physical value (e.g., sought via one or more measurements), often in the form of one or more signals, signal samples and/or states, and one component may include a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

As discussed above with respect to FIG. 6, a wireless network may be used to communicate information such as features extracted by the feature extraction module. A network may include two or more devices, such as network devices and/or computing devices, and/or may couple devices, such as network devices and/or computing devices, so that signal communications, such as in the form of signal packets and/or signal frames (e.g., including one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may include a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms "client," "client device," "client computing device," "client computing platform," and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

A computing and/or network device may include and/or may execute a variety of now known and/or to be developed operating systems, derivatives and/or versions thereof, including computer operating systems, a mobile operating system, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as operating a vehicle, browsing, searching, playing various forms of digital content, including locally stored and/or streamed video, and/or games. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   extracting one or more features of an electric current coupled to an electric vehicle in response to initiating a charging process at a first charging station, wherein extracting the one or more features of the electric current comprises detecting at least one of an indication of coupled current abnormalities, an indication of voltage abnormalities, an indication of power factor abnormalities, an indication of noise content of the coupled electric current, or an indication of total harmonic distortion of the coupled electric current;
   determining one or more performance characteristics of the electric vehicle based, at least in part, on the one or more features of the electric current coupled to the electric vehicle in response to initiating the charging process at the first charging station, wherein determining the one or more performance characteristics of the electric vehicle comprises determining a measure of electrical stress on one or more energy storage elements of the electric vehicle;
   determining a charge performance model based, at least in part, on the one or more determined performance characteristics of the electric vehicle that includes the measure of electrical stress; and
   displaying, or causing a display device of the electric vehicle to display, a recommendation for at least a second charging station based, at least in part, on the charge performance model and one or more features of the at least the second charging station.

2. The method of claim 1, wherein determining the one or more performance characteristics of the electric vehicle comprises determining a period of time to substantially fully charge the electric vehicle.

3. The method of claim 1, wherein determining the one or more performance characteristics of the electric vehicle further comprises determining a measure of thermal stress on the one or more energy storage elements of the electric vehicle.

4. The method of claim 1, wherein displaying the recommendation for the at least the second charging station is further based on computing a predicted time to at least partially charge the electric vehicle via the at least the second charging station.

5. The method of claim 1, wherein displaying the recommendation for the at least the second charging station is further based on computing an estimated travel time to the at least the second charging station.

6. The method of claim 5, further comprising displaying at least a portion of a route map from a present location to the at least the second charging station.

7. The method of claim 1, further comprising displaying a second recommendation for the at least the second charging station based, at least in part, on parameters exclusively related to the at least the second charging station.

8. The method of claim 1, wherein determining the charge performance model comprises assigning at least one weighting factor to the one or more features extracted during the charging process.

9. The method of claim 8, wherein the at least one assigned weighting factor relates to one or more of electrical or thermal stress of a battery utilized by the electric vehicle, life of a battery utilized by the electric vehicle, and age of a battery utilized by the electric vehicle.

10. The method of claim 1, wherein the recommendation for at least the second charging station is based on a driving range of the electric vehicle.

11. The method of claim 1, wherein the recommendation for at least the second charging station is based on a machine learning model.

12. The method of claim 1, further comprising displaying, or causing the display device of the electric vehicle to display, a rating for the second charging station.

13. An apparatus to recommend a charging station, comprising:
at least one memory device having instructions encoded thereon;
one or more processors coupled to at least one memory device, the one or more processors, responsive to executing the instructions, to:
extract one or more features of an electric current to be coupled to an electric vehicle in response to initiation of a charging process at a first charging station, wherein the one or more features comprises: an indication of coupled current abnormalities, an indication of voltage abnormalities, an indication of power factor abnormalities, an indication of noise content of the coupled electric current, or an indication of total harmonic distortion of the coupled electric current;
determine one or more performance characteristics of the electric vehicle based, at least in part, on the one or more features of the electric current coupled to the electric vehicle in response to initiating the charging process at the first charging station, wherein the one or more performance characteristics comprises a measure of electrical stress on one or more energy storage elements of the electric vehicle;
determine a charge performance model based, at least in part, on the one or more determined performance characteristics of the electric vehicle that includes the measure of electrical stress; and
display, or cause a display device of the electric vehicle to display, a recommendation for at least a second charging station based, at least in part, on the charge performance model and the one or more features of the at least the second charging station.

14. The apparatus of claim 13, wherein the determined one or more performance characteristics of the electric vehicle comprises a period of time to substantially fully charge the electric vehicle or a measure of thermal stress on one or more energy storage elements of the electric vehicle.

15. The apparatus of claim 13, wherein the one or more processors coupled to the at least one memory device, when displaying or causing the display device to display the recommendation for the at least the second charging station, is additionally to:
display, or cause the display device to display, a predicted time to at least partially charge the electric vehicle via the at least the second charging station.

16. The apparatus of claim 15, wherein the one or more processors coupled to the at least one memory device, when displaying or causing the display device to display the recommendation for the at least the second charging station, is additionally to:
display, or cause the display device of the electric vehicle to display, a recommendation an estimated travel time to the at least the second charging station.

17. The apparatus of claim 13, wherein the one or more processors coupled to the at least one memory device, when displaying or causing the display device to display the recommendation for the at least the second charging station, is additionally to:
display, or cause the display device of the electric vehicle to display, a location for the at least the second charging station based, at least in part, on parameters exclusively related to the at least the second charging station.

18. The apparatus of claim 13, wherein the one or more processors coupled to the at least one memory device are additionally to determine the charge performance model via assignment of at least one weighting factor to the one or more features extracted during the process to charge the electric vehicle.

19. An article comprising:
a non-transitory computer-readable medium having instructions encoded thereon which, responsive to execution by a processor coupled to at least one memory device, are operable to:
extract one or more features of an electric current to be coupled to an electric vehicle in response to initiation of a charging process at a first charging station, wherein the one or more features comprises: an indication of coupled current abnormalities, an indication of voltage abnormalities, an indication of power factor abnormalities, an indication of noise content of the coupled electric current, or an indication of total harmonic distortion of the coupled electric current;
determine one or more performance characteristics of the electric vehicle responsive to the one or more features of the electric current coupled to the electric vehicle in the charging process at the first charging station, wherein the one or more performance characteristics comprises a measure of electrical stress on one or more energy storage elements of the electric vehicle;
determine a charge performance model based, at least in part, on the one or more determined performance characteristics of the electric vehicle that includes the measure of electrical stress; and
display a recommendation for at least a second charging station based, at least in part, on the charge performance model and one or more features of the at least the second charging station.

20. The article of claim 19, wherein the determined one or more performance characteristics of the electric vehicle comprises one or more of a measure of a period of time to substantially fully charge the electric vehicle, a measure of thermal stress on one or more energy storage elements of the electric vehicle, a measure of the life of one or more energy storage elements of the electric vehicle, and a measure of the age of one or more storage elements of the electric vehicle.

* * * * *